US008469463B2

(12) United States Patent
Sonoda et al.

(10) Patent No.: US 8,469,463 B2
(45) Date of Patent: Jun. 25, 2013

(54) BRAKE CONTROL APPARATUS AND METHOD FOR CONTROLLING THE BRAKE

(75) Inventors: Hiroki Sonoda, Atsugi (JP); Motohiro Higuma, Atsugi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 555 days.

(21) Appl. No.: 12/649,740

(22) Filed: Dec. 30, 2009

(65) Prior Publication Data

US 2010/0187901 A1    Jul. 29, 2010

(30) Foreign Application Priority Data

Aug. 25, 2008    (JP) .................................. 2008-214991

(51) Int. Cl.
*B60T 8/40* (2006.01)
*B60T 8/17* (2006.01)

(52) U.S. Cl.
USPC ........ 303/116.1; 303/11; 303/115.4; 303/152

(58) Field of Classification Search
USPC .................... 303/10, 11, 113.1, 113.2, 113.3, 303/115.1, 115.4, 116.1, 151, 152
See application file for complete search history.

(56) References Cited

U.S. PATENT DOCUMENTS

| 5,924,775 | A * | 7/1999 | Steffes ............................. 303/10 |
| 6,425,644 | B2 * | 7/2002 | Kawahata et al. ......... 303/113.3 |
| 6,464,307 | B1 * | 10/2002 | Yoshino .......................... 303/11 |
| 6,494,547 | B2 * | 12/2002 | Higashimura et al. ........ 303/152 |
| 7,010,410 | B2 * | 3/2006 | Zhang et al. ..................... 303/11 |
| 2004/0061375 | A1 * | 4/2004 | Drott et al. ...................... 303/20 |
| 2005/0162010 | A1 * | 7/2005 | Kamiya et al. ............. 303/113.4 |
| 2006/0017319 | A1 * | 1/2006 | Kohl et al. ....................... 303/11 |
| 2006/0186735 | A1 * | 8/2006 | Ullrich et al. ............. 303/122.14 |
| 2010/0244547 | A1 * | 9/2010 | Gilles et al. ........................ 303/3 |
| 2010/0282549 | A1 * | 11/2010 | Feigel et al. .................. 188/110 |
| 2011/0025120 | A1 * | 2/2011 | Joyce .............................. 303/11 |
| 2012/0056471 | A1 * | 3/2012 | Plewnia et al. ............. 303/113.1 |

FOREIGN PATENT DOCUMENTS

| JP | 11198786 A | * | 7/1999 |
| JP | 2007-276550 | | 10/2007 |
| WO | WO 2008017726 A1 | * | 2/2008 |

* cited by examiner

*Primary Examiner* — Thomas J Williams
(74) *Attorney, Agent, or Firm* — Antonelli, Terry, Stout & Kraus, LLP.

(57) ABSTRACT

[OBJECT] To provide a brake control apparatus and method for controlling the brake which is capable of preventing a fluctuation of a brake pedal stroke amount when switching a regenerative braking force to a hydraulic braking force.
[MEANS TO SOLVE] A brake control apparatus has a stroke simulator 39 into which a brake fluid that flows out of a master cylinder M/C by driver's braking operation is able to flow; a pipe 11 which connects the stroke simulator 39 and the master cylinder M/C; a gate-in valve 2 which is set on the pipe 11 and opens/closes the pipe 11; a pump P which pumps up the brake fluid flowing into the stroke simulator 39 from the master cylinder M/C and can increase a pressure of a wheel cylinder W/C that is provided for each wheel; an HU 31 which increases the wheel cylinder pressure by the brake fluid flowing into the stroke simulator 39 and pumped up by the pump P, together with at least the gate-in valve 2; and a regenerative brake unit which is provided separately from the HU 31 and produces a regenerative braking force for the wheel.

18 Claims, 10 Drawing Sheets

BRAKE CONTROL APPARATUS AND METHOD FOR CONTROLLING THE BRAKE

TECHNICAL FIELD

The present invention belongs to a technical field of brake control apparatus and method for controlling the brake.

BACKGROUND ART

Patent Document 1 discloses the following technique; when a regenerative braking force decreases with decrease in vehicle speed etc., the technique compensates for lack of braking force due to the decrease of the regenerative braking force with a hydraulic braking force by driving a pump of a hydraulic pressure control unit and supplying a brake fluid in a master cylinder to a wheel cylinder.
[Patent Document 1]
Japanese Patent Application Kokai Publication No. 2007-276550

DISCLOSURE OF INVENTION

Technical Problem

In the above related art technique, however, when switching the regenerative braking force to the hydraulic braking force, despite the fact that a driver does not further depress a brake pedal, a brake pedal stroke amount increases with the decrease in the brake fluid in the master cylinder. Thus this causes a problem that gives an awkward feeling to the driver.

It is therefore an object of the present invention to provide a brake control apparatus and method for controlling the brake which is capable of preventing a fluctuation of the brake pedal stroke amount when switching the regenerative braking force to the hydraulic braking force.

Technical Solution

To achieve the object, a brake control apparatus of the present invention comprises: a volume chamber into which a brake fluid that flows out of a master cylinder by driver's braking operation is able to flow; a first oil passage which connects the volume chamber and the master cylinder; an electromagnetic valve which is set on the first oil passage and opens/closes the first oil passage; a pump which pumps up the brake fluid flowing into the volume chamber from the master cylinder and can increase a pressure of a wheel cylinder that is provided for each wheel; a hydraulic pressure control unit which increases the wheel cylinder pressure by the brake fluid flowing into the volume chamber and pumped up by the pump, together with at least the electromagnetic valve; and a regenerative brake unit which is provided separately from the hydraulic pressure control unit and produces a regenerative braking force for the wheel.

Further, a brake control apparatus comprises: a stroke simulator into which a brake fluid that flows out of a master cylinder by driver's braking operation is able to flow; a first oil passage which connects the stroke simulator and the master cylinder; an electromagnetic valve which is set on the first oil passage and opens/closes the first oil passage; a pump which can increase a pressure of a wheel cylinder that is provided for each wheel; a second oil passage which connects the stroke simulator and an inlet section of the pump; a third oil passage which connects an outlet section of the pump and the wheel cylinder; a fourth oil passage which branches off from a some middle point between the electromagnetic valve on the first oil passage and the master cylinder and connects with the third oil passage; a hydraulic brake control unit which controls at least the electromagnetic valve and the pump; a regenerative brake unit which produces a regenerative braking force for the wheel separately from the hydraulic brake control unit; and when the regenerative brake unit is operating by the driver's braking operation, the hydraulic brake control unit is configured to perform a valve open control of the electromagnetic valve and allow the brake fluid in the master cylinder to flow into the stroke simulator, and when the operation of the regenerative brake unit and an operation of the hydraulic brake control unit are switched, the hydraulic brake control unit is configured to pump up the brake fluid flowing into the stroke simulator into the wheel cylinder by the pump.

In addition, a method for controlling brake of a brake apparatus, the brake apparatus has: a hydraulic pressure control unit having a pump which pumps up a brake fluid in a stroke simulator into which the brake fluid flowing out of a master cylinder by driver's braking operation is able to flow and can increase a pressure of a wheel cylinder provided for each wheel; and a regenerative brake unit which is provided separately from the hydraulic pressure control unit and produces a regenerative braking force for the wheel, the method comprises: switching the braking to the braking by the hydraulic pressure control unit after the braking by the regenerative brake unit.

Effects of the Invention

Therefore the brake control apparatus and the method for controlling the brake of the present invention can prevent the fluctuation of the brake pedal stroke amount when switching the regenerative braking force to the hydraulic braking force.

EXPLANATION OF REFERENCE

M/C master cylinder
W/C wheel cylinder
P pump
2 gate-in valve (electromagnetic valve)
8 pipe (second oil passage)
11 pipe (first oil passage)
12 pipe (third oil passage)
13 pipe (oil passage, fourth oil passage)
15 pipe (second oil passage)
31 hydraulic pressure control unit
36 motor/generator (regenerative brake unit)
37 inverter (regenerative brake unit)
38 battery (regenerative brake unit)
39 stroke simulator (volume chamber)

BEST MODE FOR CARRYING OUT THE INVENTION

In the following, best modes for realizing a brake control apparatus of the present invention will be explained with reference to the drawings.

Embodiment 1

First, a system will be explained.

Figure 1:
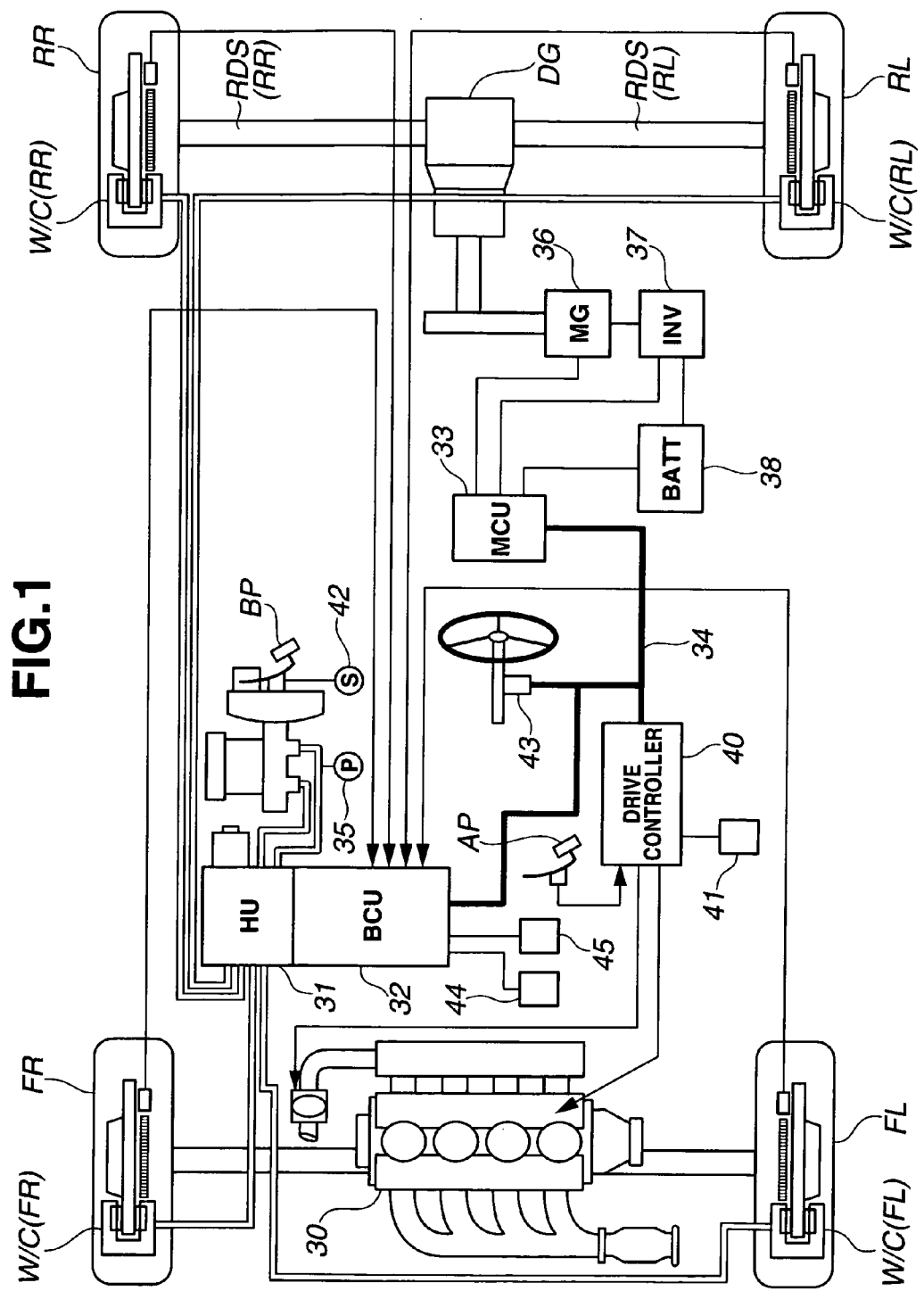
FIG. 1 is a system block diagram showing a brake control apparatus in a vehicle, using a brake control apparatus of an embodiment 1.

FIG. 1 is a system block diagram showing a brake control apparatus in a vehicle, using a brake control apparatus of the embodiment 1.

Figure 2:
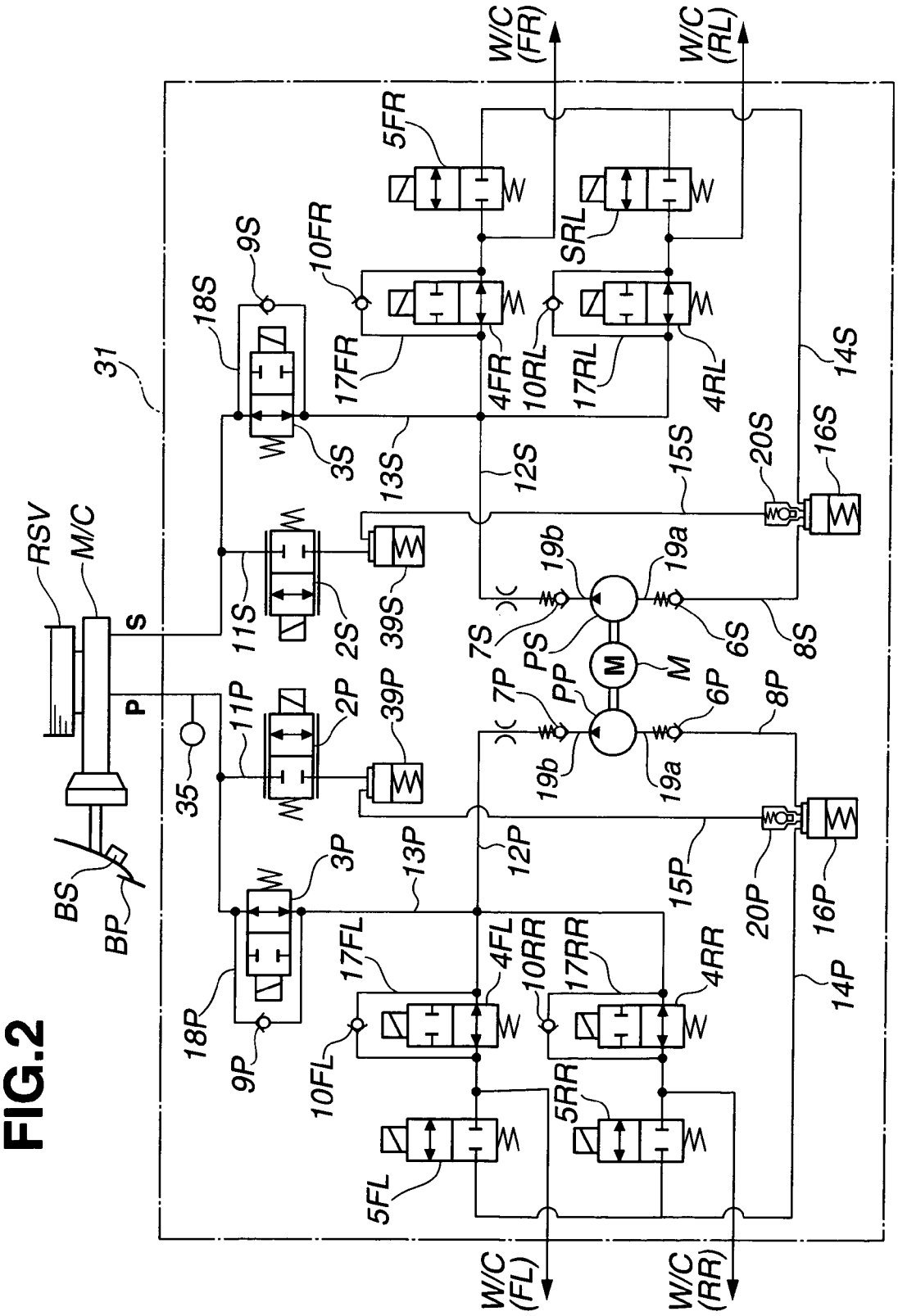
FIG. 2 is a circuit block diagram in a hydraulic pressure control unit of the embodiment 1.

FIG. 2 is a circuit block diagram in a hydraulic pressure control unit of the embodiment 1.

A hydraulic pressure control unit (HU) 31 performs holding, increase and reduction of each hydraulic pressure of a wheel cylinder W/C (FL) of a front left wheel FL, a wheel cylinder W/C (RR) of a rear right wheel RR, a wheel cylinder W/C (FR) of a front right wheel FR and a wheel cylinder W/C (RL) of a rear left wheel RL, on the basis of a hydraulic braking force command from a brake control unit (BCU) 32.

A regenerative brake unit, which is provided separately from the HU 31 and produces a regenerative braking force to the wheels (the rear left and right wheels RL, RR), is formed by a motor/generator 36, an inverter 37 and a battery 38.

The motor/generator 36 is connected to rear drive shafts RDS (RL), RDS (RR) of the rear left and rear right wheels RL, RR through a differential gear DG. The motor/generator 36 performs a power running operation or a regenerative operation and provides a driving force or the regenerative braking force to the rear wheels RL and RR on the basis of a command from a motor control unit (MCU) 33.

The inverter 37 converts a power of the battery 38 and supplies it to the motor/generator 36 when the motor/generator 36 performs the power running operation. On the other hand, the inverter 37 converts a power generated in the motor/generator 36 and charges the battery 38 when the motor/generator 36 performs the regenerative operation.

The motor control unit (MCU) 33 controls the power running operation of the motor/generator 36 on the basis of a driving force command from a drive controller 40. Further, the motor control unit (MCU) 33 controls the regenerative operation of the motor/generator 36 on the basis of a regenerative braking force command from the BCU 32.

The MCU 33 sends a state of an output control of the regenerative braking force and the driving force by the motor/generator 36 and a generatable maximum regenerative braking force to the BCU 32 and the drive controller 40 through a CAN communication line 34.

Here, with regard to "the generatable maximum regenerative braking force", it is calculated from, for example, a vehicle speed that is calculated (estimated) through a battery SOC and a wheel speed sensor 44. Further, a steering characteristic of the vehicle is also taken into consideration when cornering.

In a case where the battery 38 is in a fully charged state or an almost fully charged state, there is a need to prevent overcharging in terms of the life of the battery. Further, when the vehicle speed decreases by the braking, the generatable maximum regenerative braking force by the motor/generator 36 is reduced. Furthermore, when performing the regenerative braking during a high speed running, a load of the inverter 37 becomes high. Thus the maximum regenerative braking force is limited during the high speed running.

In addition, in the vehicle in the embodiment 1, because the regenerative braking force is applied to the rear wheels, in a case of an excess of the regenerative braking force relative to the hydraulic braking force during the cornering, namely that when the braking force of the rear wheels is too great as compared with that of the front wheels during the cornering, the steering characteristic of the vehicle becomes an excess oversteer state, and cornering behavior is disrupted. Because of this, in a case where the tendency of the oversteer becomes stronger, it is required that the maximum regenerative braking force should be limited and an allocation of the braking force to the front and rear wheels during the cornering should be closer to an ideal allocation (e.g. front:rear=6:4) according to specifications of the vehicle.

The drive controller 40 inputs an accelerator opening from an accelerator opening sensor 41, the vehicle speed calculated by the wheel speed sensor 44, the battery SOC and so on, directly or through the CAN communication line 34.

The drive controller 40 carries out an operation control of an engine 30, an operation control of an automatic transmission (not shown) and an operation control of the motor/generator 36 by the driving force command to the MCU 33, on the basis of information from each sensor such as the accelerator opening sensor 41.

The BCU 32 inputs a master cylinder pressure from a master cylinder pressure sensor 35, a brake pedal stroke amount from a brake pedal stroke sensor 42, a steering angle from a steering angle sensor 43, each wheel speed from the wheel speed sensor 44, a yaw rate from a yaw rate sensor 45, the battery SOC and so on, directly or through the CAN communication line 34.

The BCU 32 calculates the braking force (for each wheel) required for the braking of the vehicle on the basis of information from each sensor such as the brake pedal stroke sensor 42, and splits the required braking force between the regenerative braking force and the hydraulic braking force, then performs an operation control of the HU 31 by the hydraulic braking force command from the BCU 32 and an operation control of the motor/generator 36 by a regenerative braking force command to the MCU 33.

Here, in the embodiment 1, the regenerative braking force is used in preference to the hydraulic braking force. As long as the required braking force can be covered by the regenerative braking force, a range of the regenerative braking is extended to the maximum (the maximum regenerative braking force) without using the hydraulic braking force. With this, particularly in a drive pattern in which acceleration and deceleration are repeated, recovery of energy by the regenerative braking is realized up to a lower speed range, and energy-recovery efficiency becomes high. In the case where the regenerative braking force is limited due to the decrease in the vehicle speed etc. during the regenerative braking, the BCU 32 performs the switch of the braking force, which switches the regenerative braking force to the hydraulic braking force, then secures the required braking force. The BCU 32 in the embodiment 1 corresponds to a braking force switch control means that switches between the braking force (the regenerative braking force) by the regenerative brake unit and the braking force (the hydraulic braking force) by the HU 31.

At a normal control, the BCU 32 calculates the required braking force in accordance with an operation state of the brake pedal BP by the driver. And also, at an automatic brake control, the BCU 32 calculates the braking force required for the automatic brake control in accordance with the operation state of the brake pedal BP and the information from each sensor. Here, the automatic brake control is the following control.

(a) an anti-lock brake (ABS) control which estimates the vehicle speed (a pseudo vehicle speed) on the basis of the wheel speed and increases/reduces or holds the wheel cylinder pressure so that the wheel speed of each wheel becomes identical with the vehicle speed (or so that the wheel cylinder pressure becomes identical with a pressure reduction threshold value that is obtained by subtracting a certain value from the vehicle speed) (that is, the BCU 32 corresponds to the anti-lock brake control means.)

(b) a control that automatically produces the braking force as necessary, to optimize the vehicle speed with consideration given to a distance to a forward-running vehicle by an auto cruise control (c) a vehicle behavior stabilization control which generates a yaw moment that returns a steering direction to a neutral direction by automatically producing the braking force to a certain wheel when the steering characteristic of the vehicle becomes an excess understeer state or the excess oversteer state upon the cornering Next, the hydraulic circuit block diagram of the HU 31 will be explained on the basis of FIG. 2.

The HU 31 in the embodiment 1 has a so-called X-piping arrangement (x-pipe system) that is formed from two line pipes of a P line pipe and an S line pipe. Further, the HU 31 in the embodiment 1 employs a closed hydraulic circuit. Here, "closed hydraulic circuit" is a hydraulic circuit in which a brake fluid that is supplied to the wheel cylinder W/C is returned to a reservoir tank RSV via a master cylinder M/C. In contrast to the closed hydraulic circuit, a hydraulic circuit in which the brake fluid supplied to the wheel cylinder W/C can be directly returned to the reservoir tank RSV without via the master cylinder M/C, is called "open hydraulic circuit".

The P line pipe is connected to the wheel cylinder W/C (FL) of the left front (FL) wheel and the wheel cylinder W/C (RR) of the right rear (RR) wheel. The S line pipe is connected to the wheel cylinder W/C (FR) of the right front (FR) wheel and the wheel cylinder W/C (RL) of the left rear (RL) wheel. As shown in FIG. 2, a pump PP is provided in the P line pipe, and a pump PS is provided in the S line pipe. These pumps PP and PS are driven by one motor M, and discharge the brake fluid that is pumped up from an inlet section 19a to an outlet section 19b. Here, as the pump, a plunger pump or a gear pump etc. could be used. In the following, the pump PP and the pump PS are described as a pump P.

The master cylinder M/C and stroke simulators 39P, 39S (hereinafter, simply described as a stroke simulator 39) are connected by pipes 11P, 11S (that are first oil passages which connect the stroke simulator 39 that is a volume chamber and the master cylinder M/C, hereinafter, simply described as a pipe 11). On the each pipe 11, gate-in valves 2P, 2S (hereinafter, simply described as a gate-in valve 2) of a normally-closed type proportional electromagnetic valve are provided.

Regarding this gate-in valve 2, a valve body is set so that the brake fluid flowing out of the master cylinder M/C acts in a valve open direction.

The stroke simulator 39 is provided with, for example, a gas spring in its inside, and stores the brake fluid outputted from the master cylinder M/C in accordance with the stroke amount of the brake pedal BP. Further, the stroke simulator 39 produces such a reaction force as to give a good brake feel to the driver in accordance with a depression force of the brake pedal BP. Here, as a good reaction characteristic, for example, it is desirable that the reaction characteristic have such a nonlinearity that when the brake pedal stroke amount is large, a rate of increase of the reaction force with respect to the stroke amount increase is relatively high.

The stroke simulators 39P, 39S and low pressure reservoirs 16P, 16S (hereinafter, simply described as a reservoir 16) are connected by pipes 15P, 15S (hereinafter, simply described as a pipe 15). The reservoir 16 has pressure-sensitive type check valve mechanisms 20P, 20S (hereinafter, simply described as a check valve mechanism 20) which allow a flow of the brake fluid in a direction from the pipe 15 to an inside of the reservoir 16 at a low pressure where a pressure in the pipe 15 is a certain pressure or less, and forbid the brake fluid flow in the direction from the pipe 15 to the reservoir inside at a high pressure where the pressure in the pipe 15 exceeds the certain pressure.

The stroke simulator 39 and a suction side of the pump P are connected by pipes 8P, 8S (hereinafter, simply described as a pipe 8). A second oil passage that connects the stroke simulator 39 and the inlet section 19a of the pump P is formed by the pipe 15 and the pipe 8. Further, on the pipe 8, check valves 6P, 6S (hereinafter, simply described as a check valve 6) are provided. Each of these check valves 6 allows the brake fluid flow in a direction from the reservoir 16 to the pump P, and forbids the brake fluid flow of the opposite direction.

A discharge side of the each pump P and the each wheel cylinder W/C are connected by pipes 12P, 12S (that are third oil passages which connect the outlet section 19b of the pump P and the wheel cylinder W/C, hereinafter, simply described as a pipe 12). On the each pipe 12, solenoid-in valves 4FL, 4RR, 4FR and 4RL (that are pressure increase valves, hereinafter, simply described as a solenoid-in valve 4) of a normally-open type electromagnetic valve are provided for the respective wheel cylinders W/C.

Furthermore, on the each pipe 12, check valves 7P, 7S (hereinafter, simply described as a check valve 7) are provided between the each solenoid-in valve 4 and the pump P. This check valve 7 allows the brake fluid flow in a direction from the pump P to the solenoid-in valve 4, and forbids the brake fluid flow of the opposite direction.

Moreover, on the each pipe 12, pipes 17FL, 17RR, 17FR and 17RL (hereinafter, simply described as a pipe 17), each of which bypasses the respective solenoid-in valves 4, are provided. On the each pipe 17, check valves 10FL, 10RR, 10FR and 10RL (hereinafter, simply described as a check valve 10) are provided. This check valve 10 allows the brake fluid flow in a direction from the wheel cylinder W/C to the pump P, and forbids the brake fluid flow of the opposite direction.

The master cylinder M/C and the pipe 12 are connected by pipes 13P and 13S (that are fourth oil passages which branch off from a some middle point between the gate-in valve 2 on the pipe 11 and the master cylinder M/C and connect with the pipe 12, hereinafter, simply described as a pipe 13). The pipe 12 and the pipe 13 meet between the pump P and the solenoid-in valve 4. On the each pipe 13, gate-out valves 3P, 3S (hereinafter, simply described as a gate-out valve 3) of a normally-open type electromagnetic valve are provided. The pipe 13 corresponds to an oil passage that connects the master cylinder M/C and the wheel cylinders W/C.

In addition, on the each pipe 13, pipes 18P, 18S (hereinafter, simply described as a pipe 18), each of which bypasses the respective gate-out valves 3, are provided. On the each pipe 18, check valves 9P, 9S (hereinafter, simply described as a check valve 9) are provided. This check valve 9 allows the brake fluid flow in a direction from the master cylinder M/C side to the wheel cylinders W/C side, and forbids the brake fluid flow of the opposite direction. The check valve 9 is designed (or is set) so that the check valve 9 operates at a predetermined pressure, which is obtained by converting the maximum regenerative braking force into a fluid pressure, or more.

The wheel cylinders W/C and the reservoir 16 are connected by pipes 14P, 14S (hereinafter, simply described as a pipe 14). On the each pipe 14, solenoid-out valves 5FL, 5RR, 5FR and 5RL (hereinafter, simply described as a solenoid-out valve 5) of a normally-closed type electromagnetic valve are provided for the respective wheel cylinders W/C.

During the automatic brake control, the HU 31 closes the gate-out valve 3 and opens the gate-in valve 2. At the same time, the HU 31 drives the pump P then supplies the brake fluid drawn from the master cylinder M/C to the pipe 12. Further, the HU 31 controls the solenoid-out valve 5 and the solenoid-in valve 4 so as to produce a wheel cylinder pressure equivalent to a braking force required for the vehicle behavior stabilization.

In addition, during the ABS control, when taking the left front (FL) wheel for example, the HU 31 opens the solenoid-out valve 5 connected to the wheel cylinder W/C and closes the solenoid-in valve 4, then performs pressure reduction by draining the brake fluid in the wheel cylinder W/C to the reservoir 16. Furthermore, in a case where the left front (FL) wheel returns from a wheel lock tendency, the HU 31 closes the solenoid-out valve 5 then holds the wheel cylinder pressure. Moreover, the HU 31 drives the pump P and opens the gate-in valve 2 then performs pressure increase as necessary.

[Cooperative Regenerative Brake Control Process]

Figure 3:
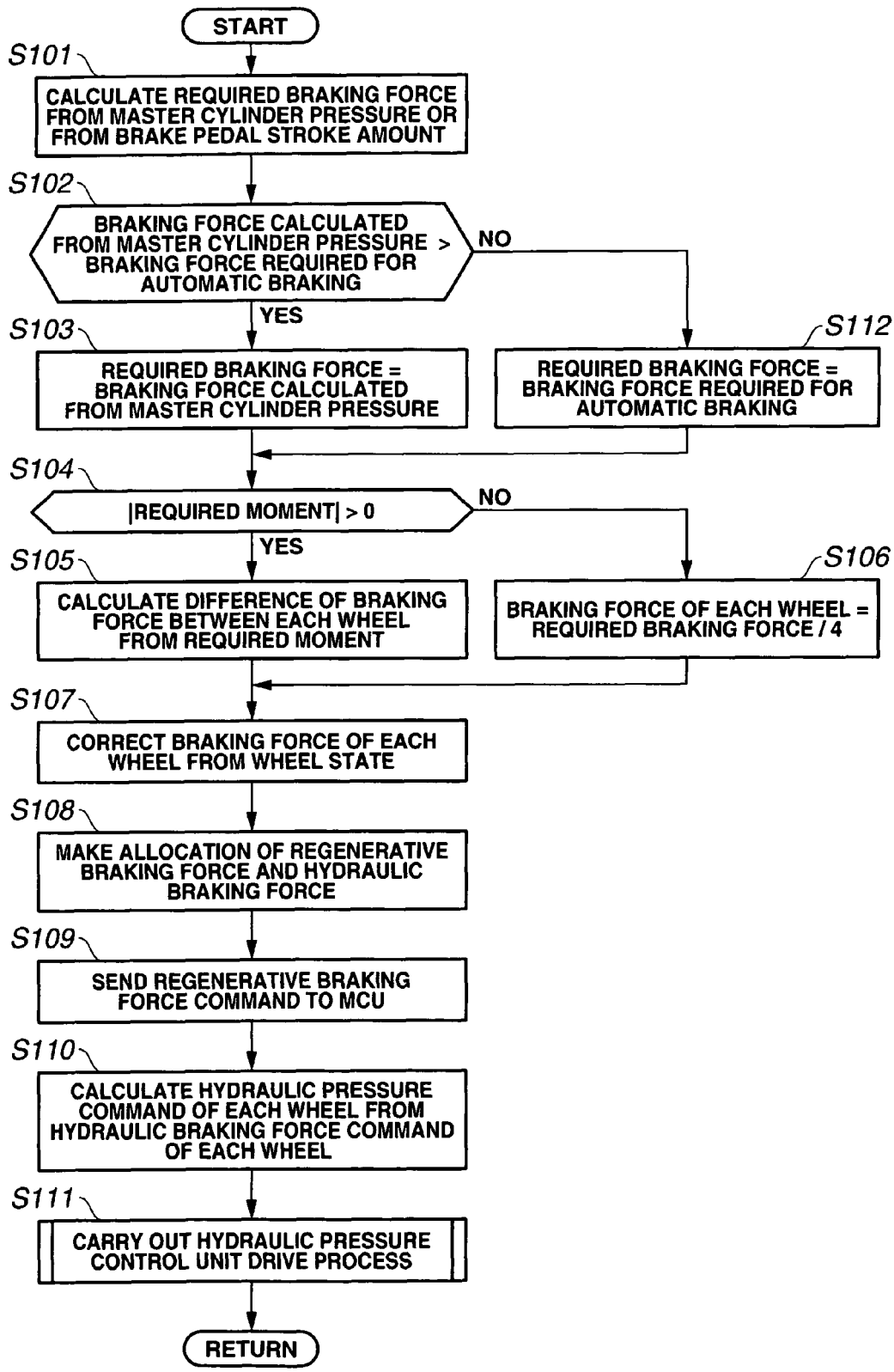
FIG. 3 is a flow chart showing a flow of a cooperative regenerative brake control process which is executed in a BCU 32 in the embodiment 1.

FIG. 3 is a flow chart showing a flow of a cooperative regenerative brake control process executed in the BCU 32 in the embodiment 1. In the following, each step will be explained. This control process is executed continually in a certain cycle.

At step S101, the BCU 32 calculates a required braking force (a braking force which the driver demands) from the master cylinder pressure detected by the master cylinder pressure sensor 35 or from the brake pedal stroke amount detected by the brake pedal stroke sensor 42, then the routine proceeds to step S102.

At step S102, a judgment is made as to whether or not the braking force calculated from the master cylinder pressure is greater than a braking force required for the automatic braking. If YES, the routine proceeds to step S103. If NO, the routine proceeds to step S112.

At step S103, the BCU 32 sets the required braking force to the braking force calculated from the master cylinder pressure at step S101, then the routine proceeds to step S104.

At step S104, a judgment is made as to whether or not an absolute value of a required moment is greater than zero. If YES, the routine proceeds to step S105. If NO, the routine proceeds to step S106. Here, "required moment" is a yawing moment of the vehicle which is necessary for obtaining a target yaw rate of the above vehicle movement control. The required yawing moment is calculated, for instance, on the basis of a difference between an actual yaw rate detected by the yaw rate sensor 45 and the target yaw rate.

At step S105, the BCU 32 calculates a difference of the braking force between the each wheel so as to generate the required yawing moment with a deceleration being constant, and determines the braking force of the each wheel. And then the routine proceeds to step S107.

At step S106, the BCU 32 sets the braking force of the each wheel to a value obtained by dividing the required braking force into quarters, then the routine proceeds to step S107.

At step S107, the BCU 32 corrects the braking force of the each wheel from a wheel state, then the routine proceeds to step S108.

At step S108, the BCU 32 makes an allocation of the regenerative braking force and the hydraulic braking force from the maximum regenerative braking force received from the MCU 33 and the braking force of the each wheel, then produces the regenerative braking force command and the hydraulic braking force command of the each wheel. And then the routine proceeds to step S109.

At step S109, the BCU 32 sends the regenerative braking force command to the MCU 33, then the routine proceeds to step S110.

At step S110, the BCU 32 calculates a hydraulic pressure command of the each wheel from the hydraulic braking force command of the each wheel, then the routine proceeds to step S111.

At step S111, the BCU 32 carries out a hydraulic pressure control unit drive process that drives the each valve 2, 3, 4 and 5 and the motor M in the HU 31 on the basis of the master cylinder pressure, the wheel cylinder pressure, a stroke simulator oil quantity and the hydraulic pressure command value. And then the routine proceeds to RETURN.

At step S112, the BCU 32 sets the required braking force to the braking force required for the automatic braking, then the routine proceeds to step S104.

That is to say, in the cooperative regenerative brake control, the driver's required braking force calculated at step S101 and the braking force for obtaining the target value of the automatic braking are compared at step S102. Then at step S103 or step S112, the braking force that is greater is set as the braking force required of the vehicle. Subsequently, when the vehicle is turning, the difference of the braking force between the each wheel to obtain the target moment is calculated at step S105. When the vehicle is travelling straight ahead, the braking force of the each wheel is equally allocated at step S106.

Next, at step S107, the braking force of the each wheel is corrected in accordance with the state of the each wheel. And at step S108, the allocation of the regenerative braking force and the hydraulic braking force is made. At step S109, the regenerative braking force command is outputted to the MCU 33. Subsequently, at step S110, the hydraulic pressure command of the each wheel is calculated, then the HU 31 is driven at step S111.

[Hydraulic Pressure Control Unit Drive Process]

Figure 4:
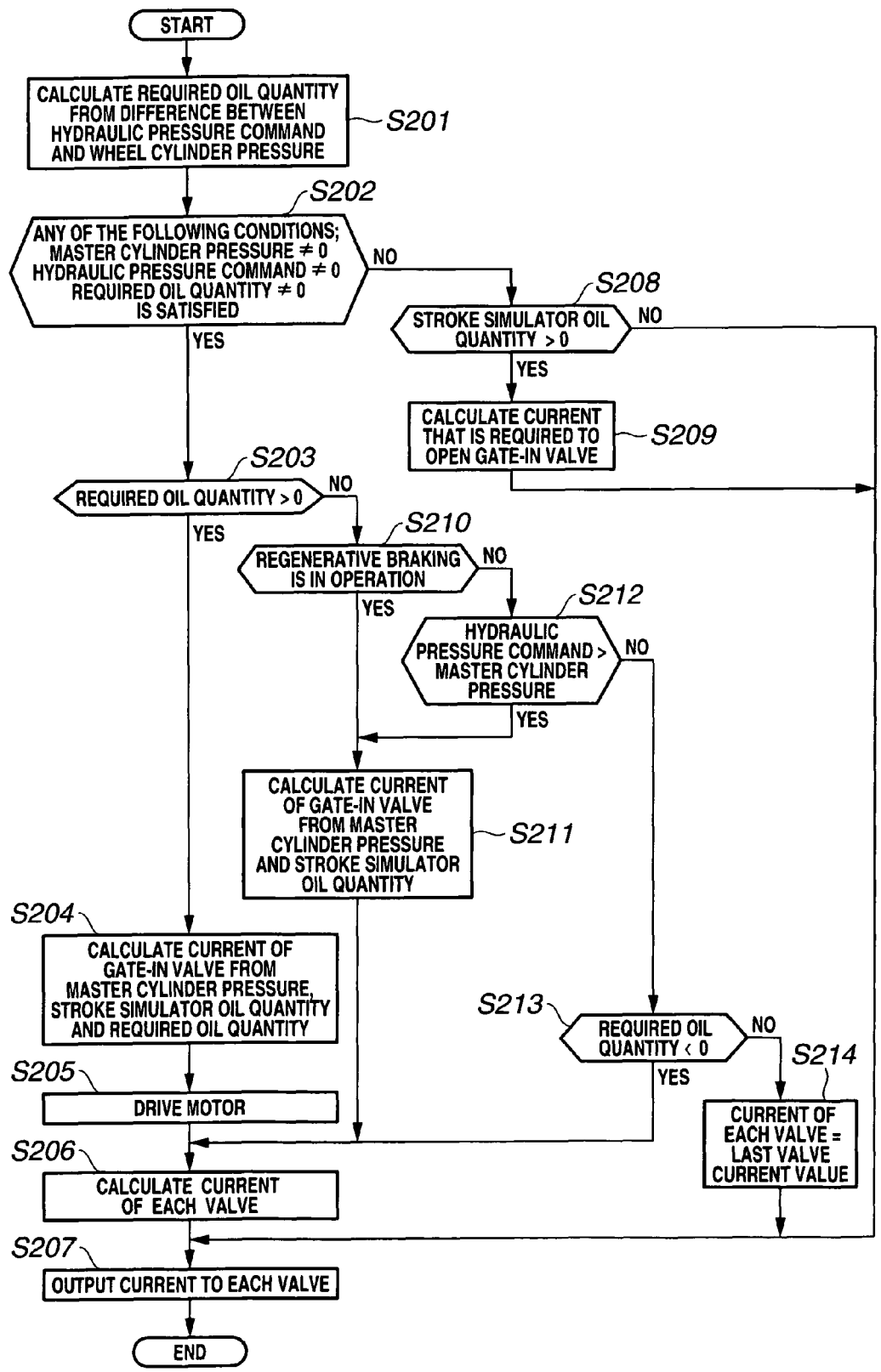
FIG. 4 is a flow chart showing a flow of the hydraulic pressure control unit drive process which is executed at step S111 in FIG. 3.

FIG. 4 is a flow chart showing a flow of the hydraulic pressure control unit drive process executed at step S111 in FIG. 3. In the following, each step will be explained.

At step S201, a required oil quantity is calculated from a difference between the hydraulic pressure command calculated at step S110 and the wheel cylinder pressure, then the routine proceeds to step S202.

At step S202, a judgment is made as to whether or not any of the following conditions; the master cylinder pressure≠0, the hydraulic pressure command≠0 and the required oil quantity≠0, is satisfied. If YES, the routine proceeds to step S203. If NO, the routine proceeds to step S208.

At step S203, a judgment is made as to whether or not the required oil quantity calculated at step S201 is greater than zero. If YES, the routine proceeds to step S204. If NO, the routine proceeds to step S210.

At step S204, a current outputted to the gate-in valve 2 is calculated from the master cylinder pressure, the stroke simulator oil quantity and the required oil quantity, then the routine proceeds to step S205.

At step S205, the motor M is driven and the pump P is operated, then the wheel cylinder pressure is increased. And then the routine proceeds to step S206.

At step S206, each current provided to the valves (the solenoid-in valve 4, the solenoid-out valve 5) is calculated from the master cylinder pressure, the wheel cylinder pressure, the stroke simulator oil quantity and the hydraulic pressure command. And then the routine proceeds to step S207.

At step S207, the current calculated at step S206 is outputted to the each valve (the solenoid-in valve 4, the solenoid-out valve 5), and this control is terminated.

At step S208, a judgment is made as to whether or not the stroke simulator oil quantity is greater than zero. If YES, the routine proceeds to step S209. If NO, the routine proceeds to step S207.

At step S209, in order to return the brake fluid stored in the stroke simulator 39 to the master cylinder M/C, a current that is required to open the gate-in valve 2 is calculated, then the routine proceeds to step S207.

At step S210, a judgment is made as to whether or not the regenerative braking is in operation. If YES, the routine proceeds to step S211. If NO, the routine proceeds to step S212.

At step S211, the current of the gate-in valve 2 is calculated from the master cylinder pressure and the stroke simulator oil quantity, then the routine proceeds to step S206.

At step S212, a judgment is made as to whether or not the hydraulic pressure command is greater than the master cylinder pressure. If YES, the routine proceeds to step S211. If NO, the routine proceeds to step S213.

At step S213, a judgment is made as to whether or not the required oil quantity calculated at step S201 is smaller than zero. If YES, the routine proceeds to step S206. If NO, the routine proceeds to step S214.

At step S214, a current state is judged to be a state that does not require changing the oil quantity, then the current of the each valve (the solenoid-in valve 4, the solenoid-out valve 5) is set to the same value as the last current value. And then the routine proceeds to step S207.

Next, the operation will be explained.

Figure 5:
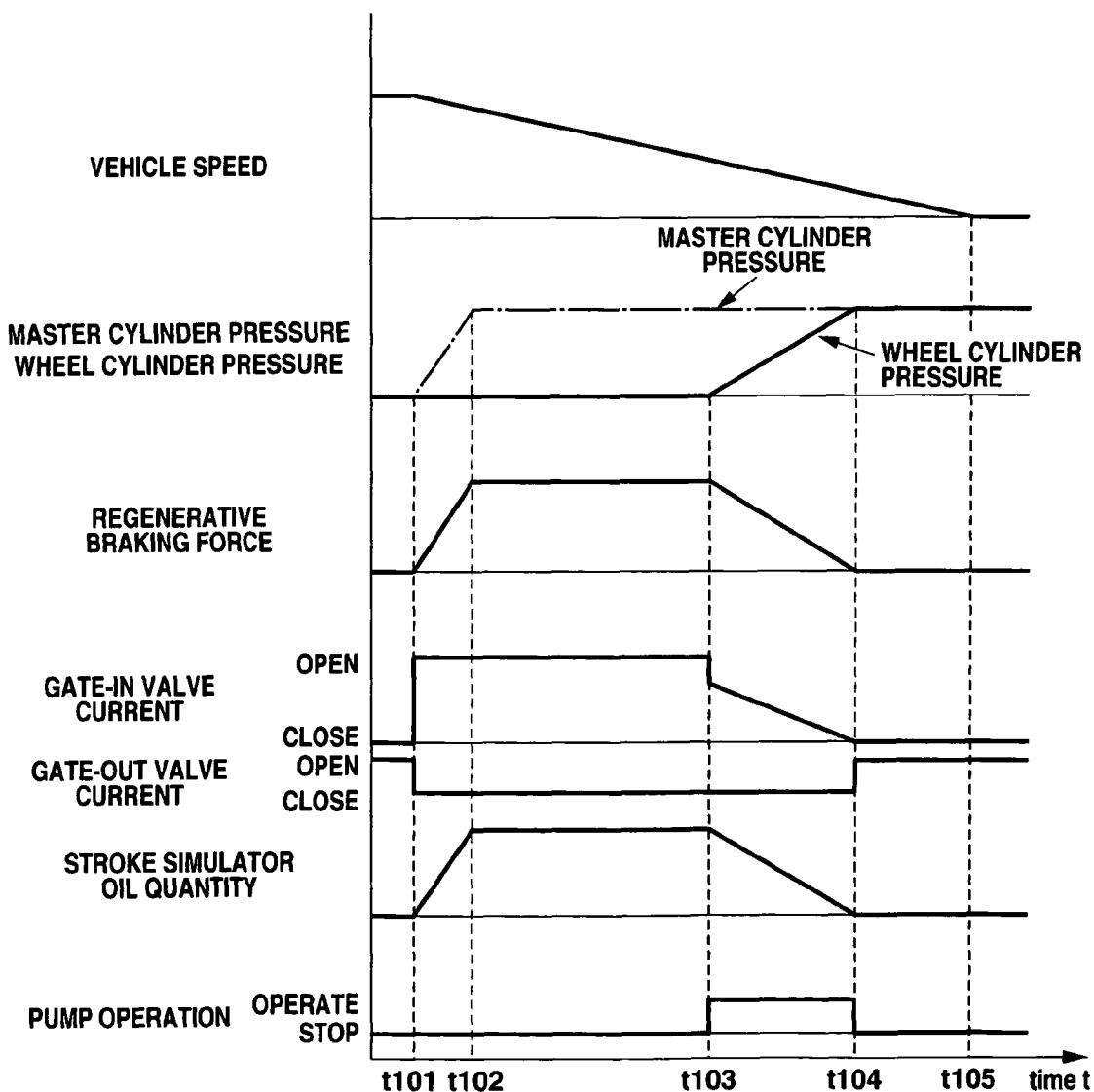
FIG. 5 is a time chart showing an operation of an HU 31 when a driver performs a constant amount of brake pedal depression in the brake control apparatus of the embodiment 1.

FIG. 5 is a time chart showing an operation of the HU 31 when the driver performs a constant amount of brake pedal depression in the brake control apparatus of the embodiment 1.

The driver does not depress the brake pedal BP during a period up to a time point t101. For this period, the BCU 32 keeps the each valve of the HU 31 in the normal control state (the gate-in valve 2: closed, the gate-out valve 3: open, the solenoid-in valve 4: open, the solenoid-out valve 5: closed).

At time point t101, the driver starts the operation of the brake pedal BP to perform the braking. During a period from time point t101 to time point t102, by further depression of the brake pedal BP by the driver, the master cylinder pressure is increased. At this time, the MCU 33 produces the regenerative braking force according to the master cylinder pressure detected by the master cylinder pressure sensor 35, namely that the MCU 33 produces the braking force according to the driver's braking force demand by only the regenerative braking force. An energy recovery efficiency can be therefore increased.

Further, the BCU 32 performs a proportional control of the gate-in valve 2 and opens the gate-in valve 2, and closes the gate-out valve 3. With this control, the brake fluid flowing into the HU 31 from the master cylinder M/C in accordance with the depression amount of the brake pedal BP can be stored in the stroke simulator 39.

At time point t103, since the regenerative braking force of the rear wheel is decreased due to the decrease of the maximum regenerative braking force with decrease in vehicle speed, the BCU 32 initiates the switch of the braking force from the regenerative braking force to the hydraulic braking force. Then during a period from time point t103 to time point t104, the pump P is operated and the brake fluid stored in the stroke simulator 39 is pumped up, then the pressure increase of the wheel cylinder W/C is performed. With this, the wheel cylinder pressure increases by the brake fluid supplied from the stroke simulator 39 to the wheel cylinder W/C, and the switch from the regenerative braking force to the hydraulic braking force is carried out, the required braking force can consequently be secured.

At this time, by performing the proportional control of the current of the gate-in valve 2 so as to gradually close the gate-in valve 2 in accordance with the required braking force and the decrease in the regenerative braking force, the inflow of the brake fluid from the master cylinder M/C to the stroke simulator 39 is forbidden.

That is to say, in the embodiment 1, when performing the switch between the regenerative braking force and the hydraulic braking force, the brake fluid in the master cylinder M/C is not supplied to the wheel cylinder W/C, but the brake fluid stored in the stroke simulator 39 is supplied to the wheel cylinder W/C. Hence, when performing the switch between the regenerative braking force and the hydraulic braking force, the fluctuation of the brake pedal stroke amount, caused by the reduction of the master cylinder pressure, can be prevented.

At time point t104, since the regenerative braking force becomes zero, by closing the gate-in valve 2 and opening the gate-out valve 3, "the master cylinder pressure=the wheel cylinder pressure" is achieved.

Figure 6:
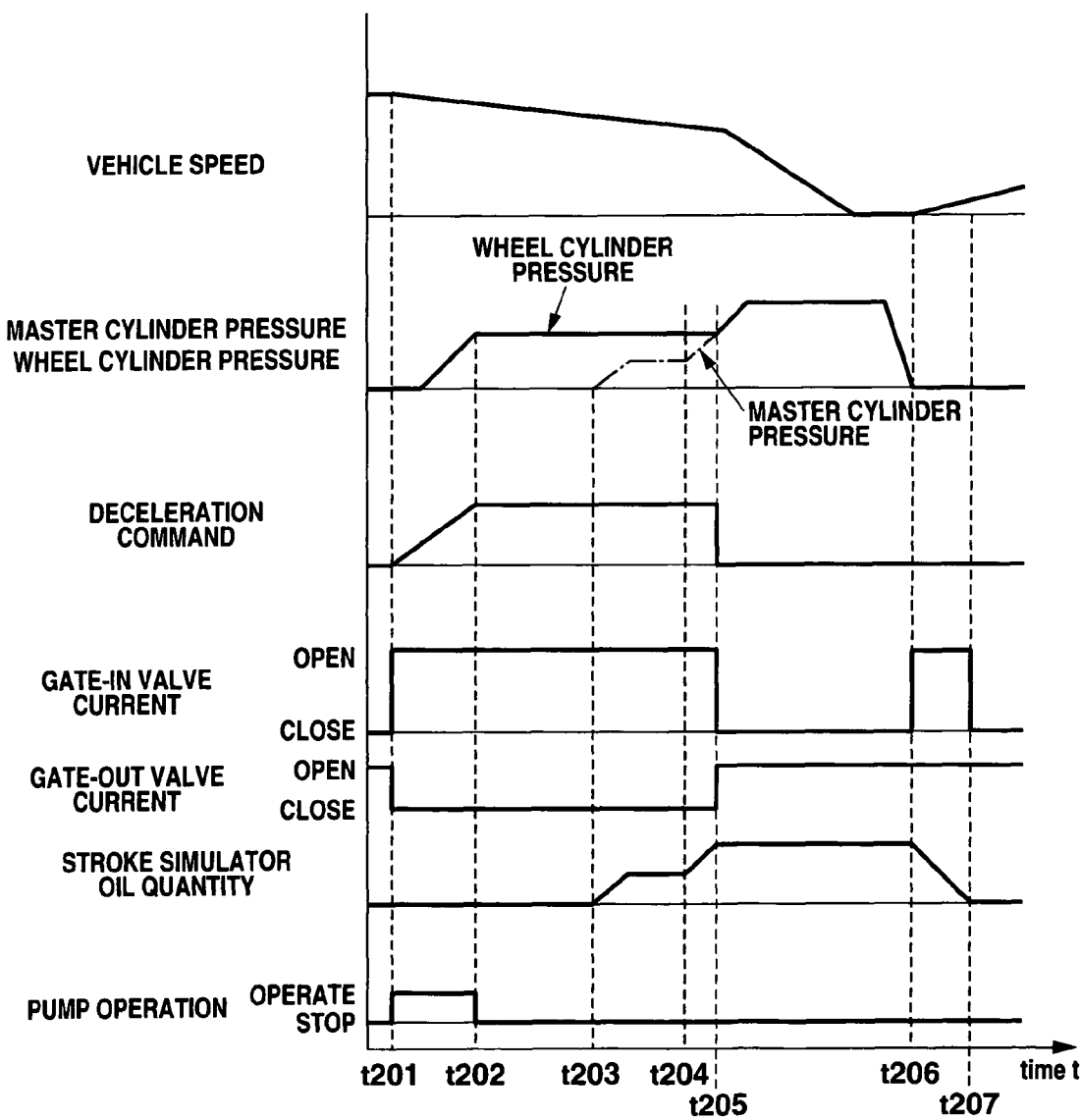
FIG. 6 is a time chart showing an operation of the HU 31 when the driver depresses the brake pedal BP during an automatic braking in the brake control apparatus of the embodiment 1.

FIG. 6 is a time chart showing an operation of the HU 31 when the driver depresses the brake pedal BP during the automatic braking in the brake control apparatus of the embodiment 1.

At time point t201, since a deceleration command of the automatic braking is issued, the BCU 32 opens the gate-in valve 2 and closes the gate-out valve 3 also operates the pump P, then performs the pressure increase of the wheel cylinder W/C.

At time point t202, since the wheel cylinder pressure reaches a value that can obtain the braking force required for the automatic braking, the pump P is stopped.

At time point t203, although the master cylinder pressure is increased by the depression of the brake pedal BP by the driver, since the deceleration command is not increased and also the braking force required for the automatic braking is greater than the braking force calculated from the master cylinder pressure (the braking force which the driver demands), the wheel cylinder pressure is not increased and the brake fluid flowing into the HU 31 from the master cylinder M/C is stored in the stroke simulator 39.

At time point t204, the driver further depresses the brake pedal BP. Then, since the driver's required braking force becomes greater than or equal to the braking force required for the automatic braking at time point t205, the BCU 32 closes the gate-in valve 2 and opens the gate-out valve 3, then the brake fluid flowing out of the master cylinder M/C is drawn to the wheel cylinder W/C.

At time point t206, the driver finishes the operation of the brake pedal BP. At this time, in a case where the brake fluid is stored in the stroke simulator 39, the BCU 32 opens the gate-in valve 2 and returns the brake fluid stored in the stroke simulator 39 to the master cylinder M/C.

At time point t207, because the brake fluid stored in the stroke simulator 39 becomes zero, the BCU 32 closes the gate-in valve 2.

Figure 7:
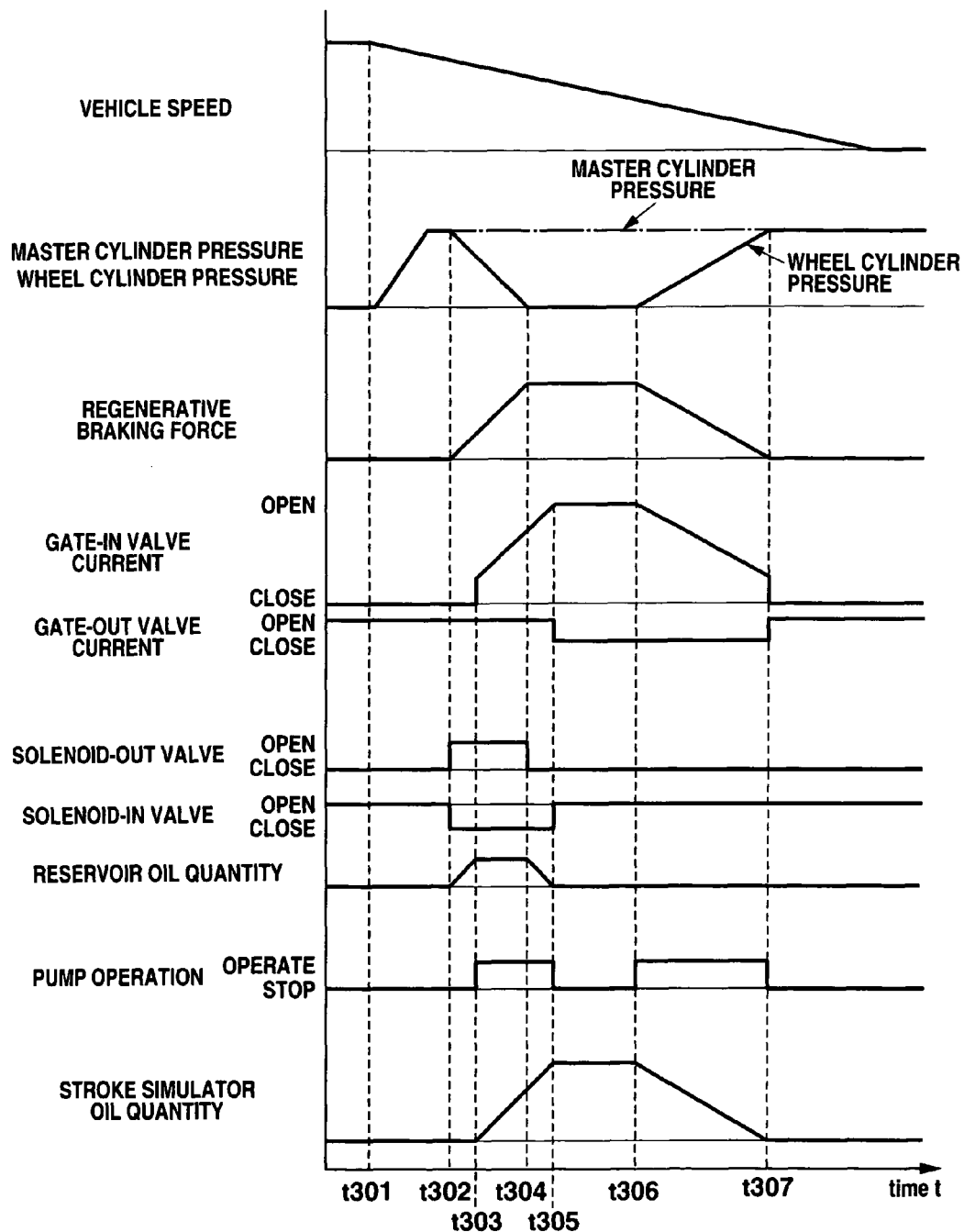
FIG. 7 is a time chart showing an operation of the HU 31 when performing the regenerative braking from a state in which a wheel cylinder pressure is high in the brake control apparatus of the embodiment 1.

FIG. 7 is a time chart showing an operation of the HU 31 when performing the regenerative braking from a state in which the wheel cylinder pressure is high in the brake control apparatus of the embodiment 1. Here, as a scene in which the regenerative braking is carried out from the state in which the wheel cylinder pressure is high, for instance, it could be a case where the deceleration is performed from a high speed range where the regenerative braking is forbidden to a vehicle speed at which the regenerative braking is permitted, or it may be a case where the vehicle starts travelling straight ahead after the turning from a condition in which the regenerative braking is forbidden during the turning.

First, the operation of the BCU 32 in the above scene will be explained. In a case where only the hydraulic braking force is outputted to the wheels and a condition of permission of the regenerative braking is satisfied in the state in which the wheel cylinder pressure is high, the BCU 32 closes the solenoid-in valve 4 and opens the solenoid-out valve 5, then reduces the wheel cylinder pressure in accordance with a rising of the regenerative braking force. Subsequently, when a quantity of the brake fluid in the reservoir 16 reaches a capacity of the reservoir, the BCU 32 opens the gate-in valve 2 and operates the pump P at the same time with this reaching being a trigger. With this control, the brake fluid pumped up by the pump P is stored in the stroke simulator 39.

That is to say, in FIG. 7, at time point t301, the driver starts the depression of the brake pedal BP. At time point t302, since the regenerative braking force rises, by closing the solenoid-in valve 4 and opening the solenoid-out valve 5, the brake fluid in the wheel cylinder W/C is stored in the reservoir 16, then the wheel cylinder pressure is reduced.

At time point t303, since the brake fluid quantity of the reservoir 16 reaches the capacity of the reservoir, the gate-in valve 2 is opened. At the same time, the pump P is driven and the brake fluid flowing to the pipe 8 from the wheel cylinder W/C is drawn to the pipe 12 by the pump P. The brake fluid is then stored in the stroke simulator 39 through the pipe 12, the pipe 13 and the pipe 11 (the pipe 12→the pipe 13→the pipe 11).

At time point t304, since the wheel cylinder pressure becomes zero, the solenoid-out valve 5 is closed. At time point t305, since the brake fluid quantity of the reservoir 16 becomes zero, the pump P is stopped, and also the solenoid-in valve 4 is opened and the gate-out valve 3 is closed.

Here, with regard to a period from time point t306 to time point t307, it is the same as the period from time point t103 to time point t104 of the time chart in FIG. 5. Thus this explanation is omitted here.

Next, effects of the embodiment 1 will be explained.

The brake control apparatus of the embodiment 1 has the following effects.

(1) The brake control apparatus comprises: the volume chamber (the stroke simulator 39) into which the brake fluid that flows out of the master cylinder M/C by driver's braking operation is able to flow; the pipe 11 (the first oil passage) which connects the volume chamber and the master cylinder M/C; the gate-in valve 2 which is set on the pipe 11 and opens/closes the pipe 11; the pump P which pumps up the brake fluid flowing into the volume chamber from the master cylinder M/C and can increase the pressure of the wheel cylinder W/C that is provided for each wheel; the HU 31 which increases the wheel cylinder W/C pressure by the brake fluid flowing into the volume chamber and pumped up by the pump P, together with at least the gate-in valve 2; and the regenerative brake unit (the motor/generator 36, the inverter 37 and the battery 38) which is provided separately from the HU 31 and produces the regenerative braking force for the wheel.

With this, when switching the regenerative braking force to the hydraulic braking force, the pump P pumps up the brake fluid stored in the volume chamber and supplies it to the wheel cylinder W/C. Therefore, the brake fluid in the master cylinder M/C is not decreased, and deterioration of the pedal feel, caused by the fluctuation of the brake pedal stroke amount, can be prevented.

(2) The volume chamber is the stroke simulator 39 that produces the reaction force for the driver's braking operation.

Thus, it is possible to further enhance the brake feel when storing the brake fluid of the master cylinder M/C in the stroke simulator 39 by a reaction force characteristic that is previously provided to the stroke simulator 39.

(3) When the regenerative brake unit is operating, since the brake fluid flowing out of the master cylinder M/C by the driver's braking operation flows into the stroke simulator 39, the pedal stroke without increasing the wheel cylinder pressure during the regenerative braking can be achieved.

(4) The HU 31 and the regenerative brake unit have respective control units (the BCU 32, the MCU 33), and the BCU 32 has the braking force switch control means (BCU 32) that switches between the braking force by the regenerative brake unit and the braking force by the HU 31.

With this, in a case where the regenerative braking is limited, or in a case where the regenerative braking is carried out from a state in which the only the hydraulic braking force is produced, the good pedal feel can be achieved while securing the braking force required of the vehicle.

(5) When the regenerative brake unit is operating, at least the gate-in valve 2 is controlled by a proportional control.

Therefore, it is possible to precisely control an oil flow amount of the gate-in valve 2 and to improve the degree of accuracy of the hydraulic pressure control. For example, when storing the brake fluid of the master cylinder M/C or the wheel cylinder W/C in the stroke simulator 39 during the regenerative braking, an increase gradient of its storage amount can be precisely controlled in accordance with a change of the regenerative braking force.

(6) The gate-in valve 2 is the normally-closed valve, and the valve body is set so that the brake fluid flowing out of the master cylinder M/C acts in the valve open direction.

Thus, when the driver further depresses the brake pedal BP, the brake fluid can flow into the stroke simulator 39 smoothly, and it is possible to facilitate the securing of the brake pedal stroke.

(7) The braking force switch control means (BCU 32) increases the braking force of the HU 31 in accordance with the decrease in the braking force of the regenerative brake unit.

Hence, the switch (the change) of the braking force from the regenerative braking force to the hydraulic braking force can be smoothly performed, and the change or fluctuation of the braking force of the vehicle at the switch of the braking force can be suppressed.

(8) The pipe 13 (the oil passage) that connects the master cylinder M/C and the wheel cylinder W/C is provided, and when the brake fluid in the stroke simulator 39 becomes empty during the HU 31 operation, the pump P is stopped and the current to the gate-in valve 2 is stopped, then the master cylinder pressure acts on the wheel cylinder W/C through the pipe 13.

With this, even in a case where the brake fluid in the stroke simulator 39 becomes empty, the pressure increase through the master cylinder M/C can be possible.

(9) When increasing the braking force of the regenerative brake unit, in a case where the brake fluid is present in the wheel cylinder W/C, the brake fluid in the wheel cylinder W/C is pumped up into the stroke simulator 39 by the pump P, and the braking force by the HU 31 is decreased and the braking force by the regenerative brake unit is increased in accordance with the decreased braking force.

With this, when switching (changing) the braking force from the hydraulic braking force to the regenerative braking force, the braking force required of the vehicle can be secured and the good pedal feel can be achieved.

(10) The stroke simulator 39 and the suction side of the pump P are connected through the low pressure reservoir 16.

Thus, it is possible to prevent an excessive pressure from directly acting on the pump P.

(11) The brake control apparatus comprises: the stroke simulator 39 into which the brake fluid that flows out of the master cylinder M/C by driver's braking operation is able to flow; the pipe 11 (the first oil passage) which connects the stroke simulator 39 and the master cylinder M/C; the gate-in valve 2 which is set on the pipe 11 and opens/closes the pipe 11; the pump P which can increase the pressure of the wheel cylinder W/C that is provided for each wheel; the pipe 15 and the pipe 8 (the second oil passage) which connect the stroke simulator 39 and the inlet section 19a of the pump P; the pipe 12 (the third oil passage) which connects the outlet section 19b of the pump P and the wheel cylinder W/C; the pipe 13 (the fourth oil passage) which branches off from a some middle point between the gate-in valve 2 on the pipe 11 and the master cylinder M/C and connects with the pipe 12; the HU 31 which controls at least the gate-in valve 2 and the pump P; the regenerative brake unit which produces the regenerative braking force for the wheel separately from the HU 31; and when the regenerative brake unit is operating by the driver's braking operation, the HU 31 is configured to perform the valve open control of the gate-in valve 2 and allow the brake fluid in the master cylinder M/C to flow into the stroke simulator 39, and when the operation of the regenerative brake unit and the operation of the HU 31 are switched, the HU 31 is configured to pump up the brake fluid flowing into the stroke simulator 39 into the wheel cylinder W/C by the pump P.

With this, when switching (changing) the braking force from the regenerative braking force to the hydraulic braking force, the braking force required of the vehicle can be secured and the good pedal feel can be achieved.

(12) The solenoid-in valve 4 which is set on the pipe 13 and opens/closes the pipe 13, and the HU 31 performs the valve close control of the solenoid-in valve 4 of the wheel when the regenerative brake unit is operating, and performs the valve open control of the solenoid-in valve 4 when the operation is switched.

With this, it is possible to prevent the master cylinder pressure from acting on the wheel cylinder W/C during the regenerative braking.

(13) The method for controlling brake of a brake apparatus, the brake apparatus has: the HU 31 having the pump P which pumps up the brake fluid in the stroke simulator 39 into which the brake fluid flowing out of the master cylinder M/C by driver's braking operation is able to flow and can increase the pressure of the wheel cylinder W/C provided for each wheel; and the regenerative brake unit which is provided separately from the HU 31 and produces the regenerative braking force for the wheel, the method comprises: switching the braking to the braking by the HU 31 after the braking by the regenerative brake unit.

With this method, the switch (the change) of the braking force from the regenerative braking force to the hydraulic braking force can be smoothly performed.

(14) With respect to the switch of the braking force, the braking force of the HU 31 is gradually increased with the decrease in the braking force of the regenerative brake unit. Accordingly, the switch of the braking force from the regenerative braking force to the hydraulic braking force can be smoothly performed, and the change or fluctuation of the braking force of the vehicle at the switch of the braking force can be suppressed.

Embodiment 2

A brake control apparatus of the embodiment 2 differs from that of the embodiment 1 in a part of the system of the hydraulic pressure control unit.

Figure 8:
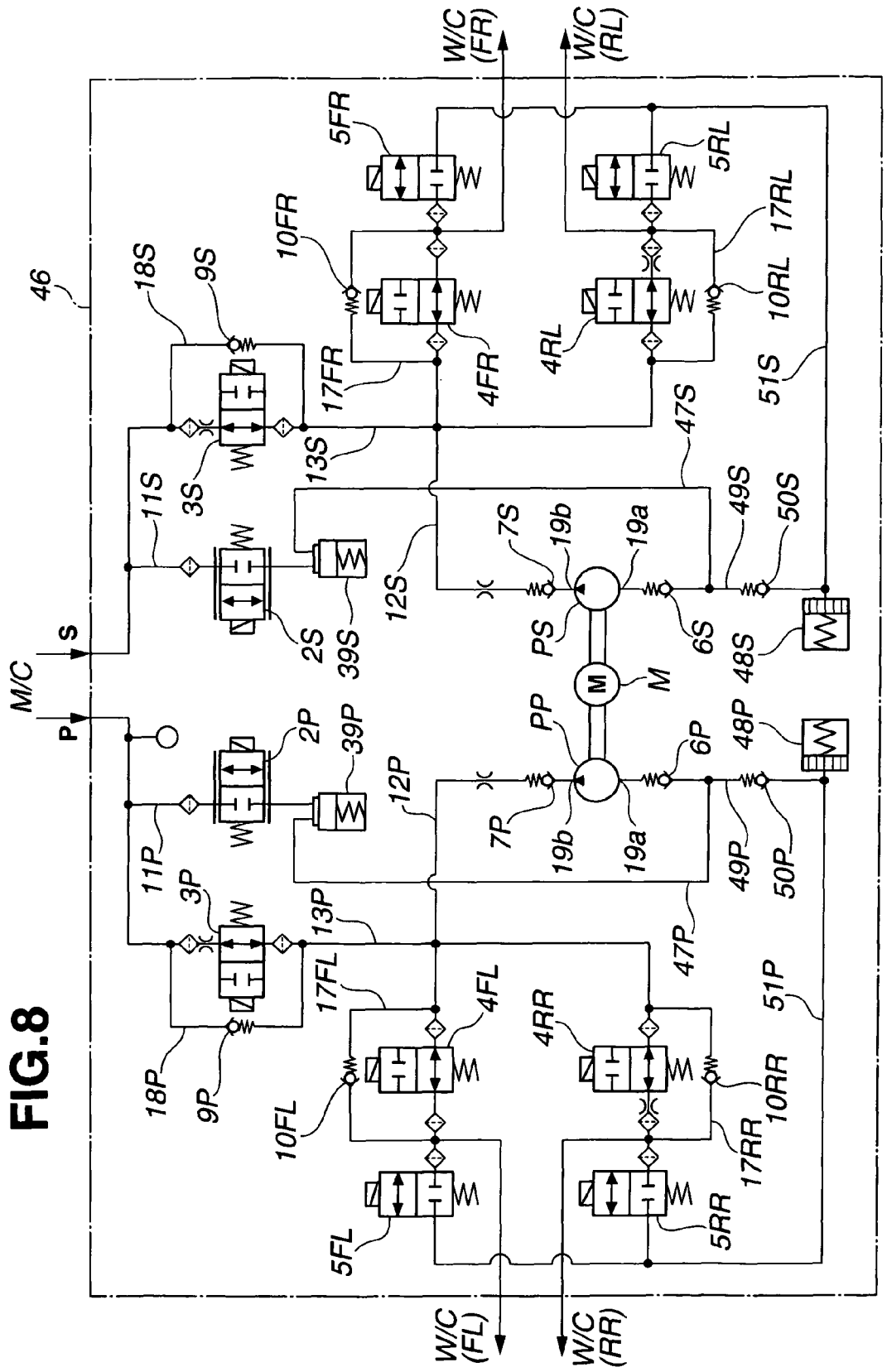
FIG. 8 is a circuit block diagram in a hydraulic pressure control unit of an embodiment 2.

FIG. 8 is a circuit block diagram in the hydraulic pressure control unit of the embodiment 2. Here, the same component or element as the embodiment 1 is denoted by the same component or element name and the same reference number.

In a hydraulic pressure control unit (HU) 46 of the embodiment 2, the stroke simulators 39P, 39S and the suction sides of the pumps PP and PS (hereinafter, simply described as the pump P) are connected by pipes 47P, 47S (hereinafter, simply described as a pipe 47).

Further, on the suction sides of the pump P, reservoirs 48P, 48S (hereinafter, simply described as a reservoir 48) are provided. This reservoir 48 and the pump P are connected by pipes 49P, 49S (hereinafter, simply described as a pipe 49). Check valves 50P, 50S (hereinafter, simply described as a check valve 50) are provided between the reservoir 48 and the pump P. Each of these check valves 50 allows the brake fluid flow in a direction from the reservoir 48 to the pump P, and forbids the brake fluid flow of the opposite direction.

The wheel cylinder W/C and the pipe 49 are connected by pipes 51P, 51S (hereinafter, simply described as a pipe 51). The pipe 51 and the pipe 49 meet between the check valve 50 and the reservoir 48. On the each pipe 51, solenoid-out valves 5FL, 5RR, 5FR and 5RL (hereinafter, simply described as a solenoid-out valve 5) of a normally-closed type electromagnetic valve are provided for the respective wheel cylinders W/C. In the embodiment 2, a second oil passage that connects the stroke simulator 39 and the inlet section 19a of the pump P is formed by the pipe 49. Other components or elements are the same as those of the embodiment 1.

Also in the brake control apparatus of the embodiment 2 having the above HU 46, the effects (1)~(9), (11)~(14) of the embodiment 1 can be gained by performing the same cooperative regenerative brake control as the embodiment 1.

Embodiment 3

A brake control apparatus of the embodiment 3 differs from that of the embodiment 2 in a part of the system of the hydraulic pressure control unit.

Figure 9:
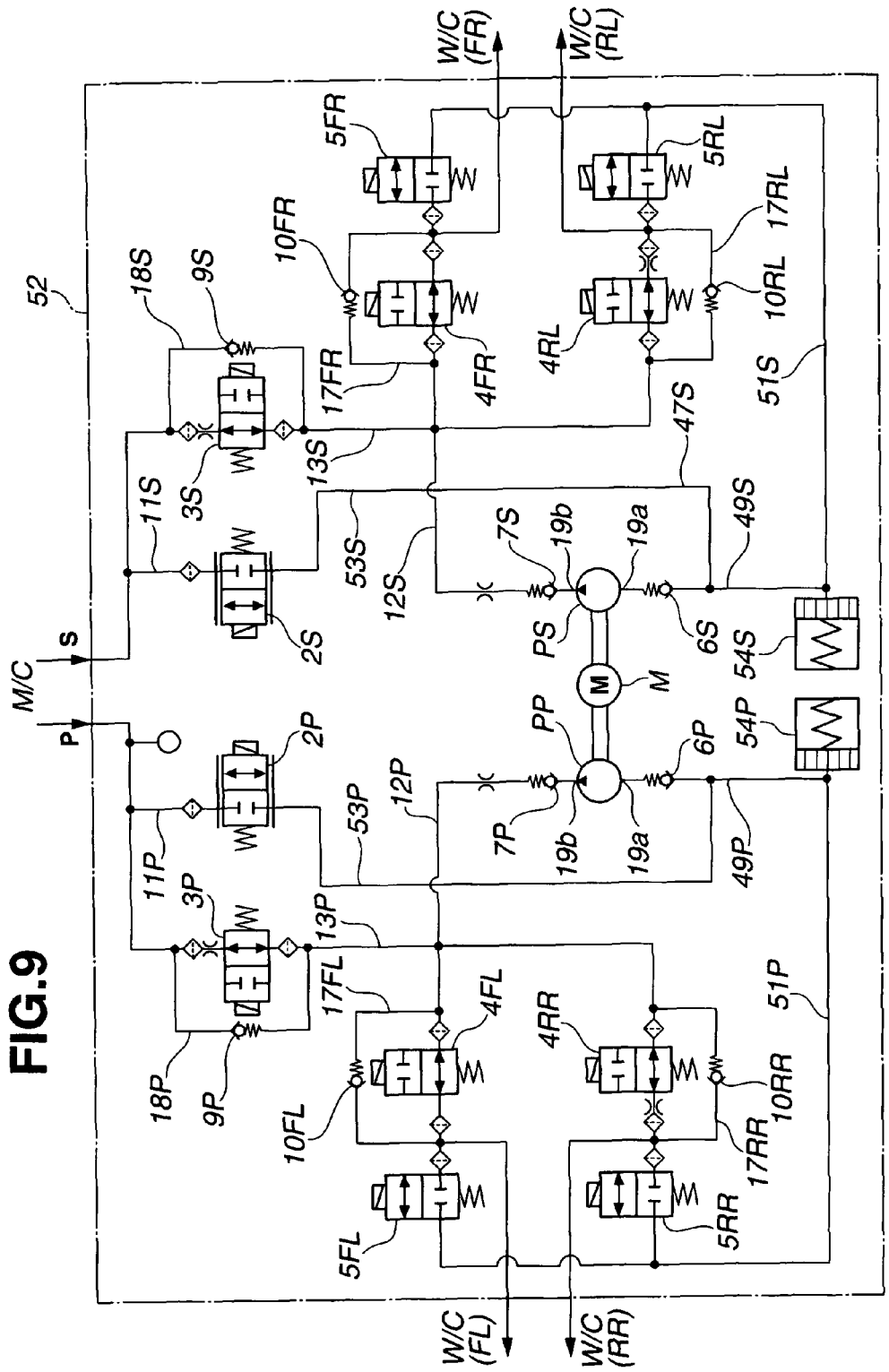
FIG. 9 is a circuit block diagram in a hydraulic pressure control unit of an embodiment 3.

FIG. 9 is a circuit block diagram in the hydraulic pressure control unit of the embodiment 3. Here, the same component or element as the embodiment 2 is denoted by the same component or element name and the same reference number.

In a hydraulic pressure control unit (HU) 52 of the embodiment 3, the master cylinder M/C and the suction sides of the pumps PP and PS (hereinafter, simply described as the pump P) are connected by pipes 53P, 53S (hereinafter, simply described as a pipe 53). On the each pipe 53, gate-in valves 2P, 2S (hereinafter, simply described as a gate-in valve 2) of a normally-closed type proportional electromagnetic valve are provided.

Reservoirs 54P, 54S (hereinafter, simply described as a reservoir 54) of the embodiment 3 are reservoirs that combine the reservoir 48 and the volume chamber (the stroke simulator 39) of the embodiment 2 shown in FIG. 8. And its reservoir capacity (a brake fluid storable capacity) is set to, for example, a value of the sum of a brake fluid storable capacity of the stroke simulator 39 and a reservoir capacity of the reservoir 48.

In the embodiment 3, a first oil passage which connects the reservoir 54 that is the volume chamber and the master cylinder M/C is formed by the pipe 53 and the pipe 49. Other components or elements are the same as those of the embodiment 2.

Upon the execution of the ABS control, when reducing the wheel cylinder pressure of the wheel, the BCU (the anti-lock brake control means) 32 closes the solenoid-in valve 4 and opens the solenoid-out valve 5, then the brake fluid in the wheel cylinder W/C is stored in the reservoir 54 through the pipe 51. That is, in the embodiment 3, the volume chamber into which the brake fluid flowing out of the master cylinder M/C by the driver's braking operation is able to flow is the reservoir 54 into which the brake fluid in the wheel cylinder W/C flows by the pressure reduction operation of the BCU 32.

Next, working and operation will be explained.

(Upon the Regenerative Braking from the Beginning of the Braking)

In the brake control apparatus of the embodiment 3, when the driver depresses the brake pedal BP to perform the braking and the regenerative braking force according to the master cylinder pressure rises, the BCU 32 performs the proportional control of the gate-in valve 2 and opens the gate-in valve 2, and closes the gate-out valve 3. With this control, the brake fluid flowing into the HU 52 from the master cylinder M/C in accordance with the depression amount of the brake pedal BP can be stored in the reservoir 54.

(Upon the Switch from the Regenerative Braking Force to the Hydraulic Braking Force)

When switching the braking force from the regenerative braking force to the hydraulic braking force due to the decrease in the regenerative braking force, the pump P is operated and the brake fluid stored in the reservoir 54 is pumped up, then the pressure increase of the wheel cylinder W/C is performed. With this, the wheel cylinder pressure increases by the brake fluid supplied from the reservoir 54 to the wheel cylinder W/C, and the switch from the regenerative braking force to the hydraulic braking force is carried out, the required braking force can consequently be secured.

At this time, by performing the proportional control of the current of the gate-in valve 2 so as to gradually close the gate-in valve 2 in accordance with the required braking force and the decrease in the regenerative braking force, the inflow of the brake fluid from the master cylinder M/C to the reservoir 54 is forbidden.

(Upon the Switch from the Hydraulic Braking Force to the Regenerative Braking Force)

When performing the regenerative braking from a state in which the hydraulic braking force is great, the BCU 32 closes the solenoid-in valve 4 and opens the solenoid-out valve 5 also stores the brake fluid of the wheel cylinder W/C in the reservoir 54, then reduces the wheel cylinder pressure in accordance with the increase in the regenerative braking force. Here, in the brake control apparatus of the embodiment 3, since the reservoir 54 that is connected to the wheel cylinder W/C through the pipe 51 also serves as the volume chamber, the pressure reduction of the wheel cylinder W/C can be carried out without driving the pump P.

As described above, in addition to the effects (1)~(9), (11)~(14) of the embodiment 1, the brake control apparatus of the embodiment 3 has the following effect.

(15) The HU 52 has the BCU 32 (the anti-lock brake control means), and the volume chamber is the reservoir 54 into which the brake fluid in the wheel cylinder W/C flows by the pressure reduction operation of the BCU 32.

That is, since the volume chamber and the reservoir are combined together, size reduction of the apparatus can be achieved as compared with the embodiments 1 and 2 in which the volume chamber and the reservoir are separately provided.

Embodiment 4

A brake control apparatus of the embodiment 4 differs from that of the embodiment 1 in a part of the system of the hydraulic pressure control unit.

Figure 10:
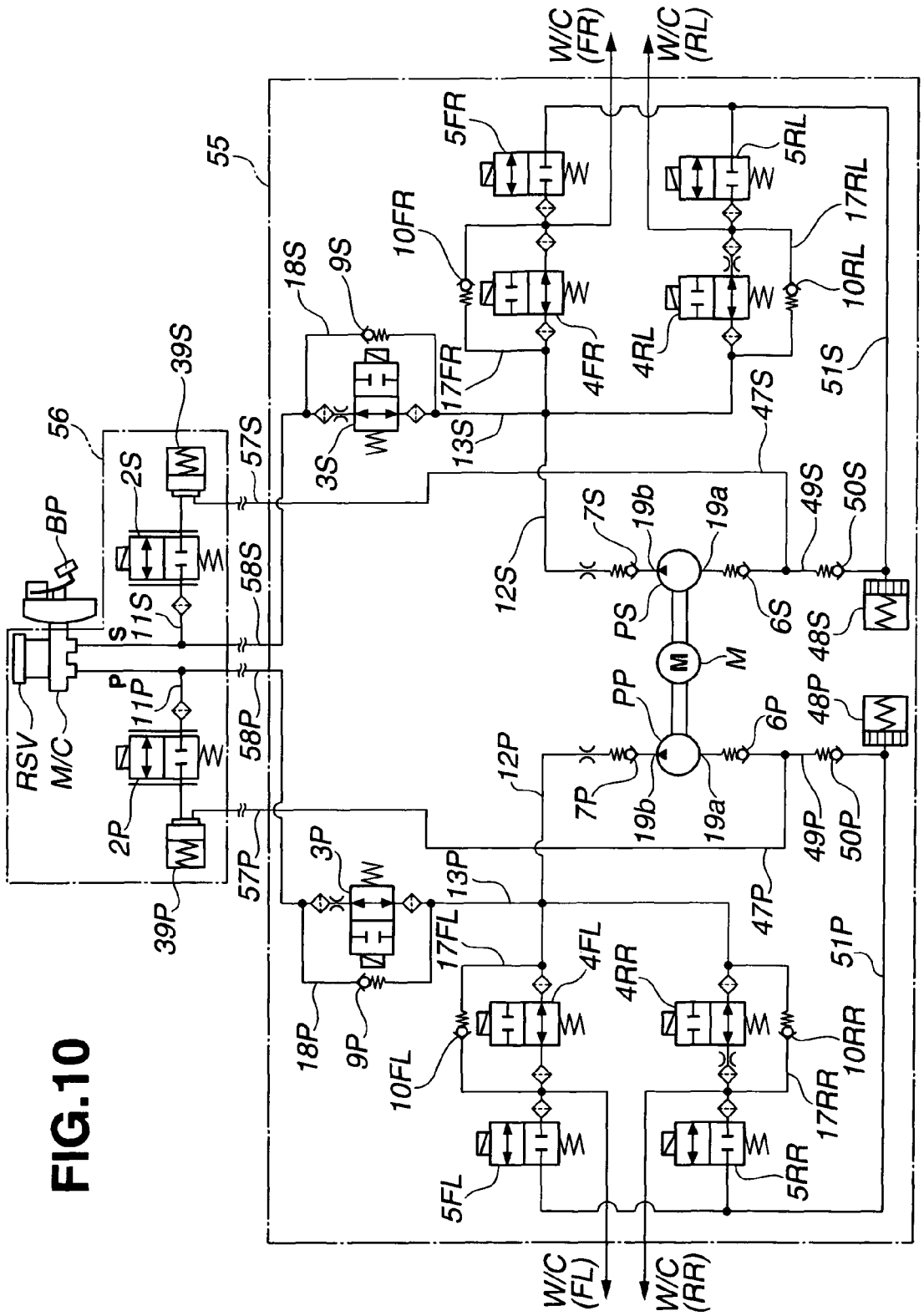
FIG. 10 is a circuit block diagram in a hydraulic pressure control unit of an embodiment 4.

FIG. 10 is a circuit block diagram in the hydraulic pressure control unit of the embodiment 4. Here, the same component or element as the embodiment 2 is denoted by the same component or element name and the same reference number.

As shown in FIG. 10, in the embodiment 4, the stroke simulator 39 of the volume chamber and the gate-in valve 2 are provided in a housing 56 where the master cylinder M/C is installed. The housing 56 is a different housing from a housing of an HU 55. The stroke simulator 39 and the pipe 47 are connected by brake pipes 57P, 57S (hereinafter, simply described as a pipe 57). The master cylinder M/C and the pipe 13 are connected by brake pipes 58P, 58S (hereinafter, simply described as a pipe 58). The reservoir 48 and the gate-in valve 2 correspond to a suction control means that is provided between the suction side of the pump P and the master cylinder M/C.

Other components or elements are the same as those of the embodiment 1.

Next, effects will be explained. In the embodiment 4, the stroke simulator 39 and the gate-in valve 2 are integrally provided with the master cylinder M/C. Therefore, since a space for arranging the stroke simulator 39 is not needed in the housing of the HU 55, a conventional hydraulic pressure control unit that is used for the ABS control and/or the vehicle behavior stabilization control etc. could be used as it is.

Hence, in addition to the effects (1)~(9), (11)~(14) of the embodiment 1, the brake control apparatus of the embodiment 4 has the following effect.

(16) The stroke simulator 39 and the gate-in valve 2 are integrally provided with the master cylinder M/C, and the HU 55 has a solenoid-in valve 4 provided on an inlet side of the wheel cylinder W/C, the solenoid-out valve 5 provided on an outlet side of the wheel cylinder W/C, the gate-out valve 3 provided between the discharge side of the pump P and the master cylinder M/C, and the suction control means (the reservoir 48, the gate-in valve 2) provided between the suction side of the pump P and the master cylinder M/C, together with the pump P, and the HU 55 is connected to the master cylinder M/C side through the brake pipes 57, 58.

With this, the conventional hydraulic pressure control unit can be used as it is, and thereby reducing cost.

Other Embodiments

Although the invention has been described above by reference to certain embodiments of the invention, the invention is not limited to the embodiments described above. Modifications and variations of the embodiments described above will occur to those skilled in the art in light of the above teachings.

For instance, in the embodiments, the braking force switch control means that switches between the braking force by the regenerative brake unit and the braking force by the hydraulic pressure control unit is the brake control unit. However, the braking force switch control means could be the motor control unit.

Further, in the embodiments, as an example, the stroke simulator with the gas spring is used. However, instead of the gas spring, a piston or a spring could be installed in the stroke simulator.

The invention claimed is:

1. A brake control apparatus comprising:
a volume chamber into which a brake fluid that flows out of a master cylinder by driver's braking operation is able to flow, wherein the volume chamber is a stroke simulator that produces a reaction force for the driver's braking operation;
a first oil passage which connects the volume chamber and the master cylinder;
an electromagnetic valve which is set on the first oil passage and opens/closes the first oil passage;
a pump which pumps up the brake fluid flowing into the volume chamber from the master cylinder and can increase a pressure of a wheel cylinder that is provided for each wheel;
a hydraulic pressure control unit which increases the wheel cylinder pressure by the brake fluid flowing into the volume chamber and pumped up by the pump, together with at least the electromagnetic valve; and
a regenerative brake unit which is provided separately from the hydraulic pressure control unit and produces a regenerative braking force for the wheel;
wherein the stroke simulator and a suction side of the pump are connected through a low pressure reservoir.

2. The brake control apparatus as claimed in claim 1, wherein
when the regenerative brake unit is operating, the brake fluid flowing out of the master cylinder by the driver's braking operation flows into the stroke simulator.

3. The brake control apparatus as claimed in claim 2, wherein
the hydraulic pressure control unit and the regenerative brake unit have respective control units, and
at least one of the control units has a braking force switch control means that switches between the braking force by the regenerative brake unit and a braking force by the hydraulic pressure control unit.

4. The brake control apparatus as claimed in claim 3, wherein
when the regenerative brake unit is operating, at least the electromagnetic valve is controlled by a proportional control.

5. The brake control apparatus as claimed in claim 4, wherein
the electromagnetic valve is a normally-closed valve, and a valve body is set so that the brake fluid flowing out of the master cylinder acts in a valve open direction.

6. The brake control apparatus as claimed in claim 3, wherein
the braking force switch control means increases the braking force of the hydraulic pressure control unit in accordance with the decrease in the braking force of the regenerative brake unit.

7. The brake control apparatus as claimed in claim 1, further comprising:
an oil passage that connects the master cylinder and the wheel cylinder, and wherein
when the brake fluid in the stroke simulator becomes empty during the hydraulic pressure control unit operation, the pump is stopped and a current to the electromagnetic valve is stopped, then a master cylinder pressure acts on the wheel cylinder through the oil passage.

8. The brake control apparatus as claimed in claim 1, wherein
when increasing the braking force of the regenerative brake unit, in a case where the brake fluid is present in the wheel cylinder, the brake fluid in the wheel cylinder is pumped up into the stroke simulator by the pump, and a braking force by the hydraulic pressure control unit is decreased and the braking force by the regenerative brake unit is increased in accordance with the decreased braking force.

9. The brake control apparatus as claimed in claim 1, wherein
the hydraulic pressure control unit has an anti-lock brake control means, and
the volume chamber functions as a reservoir into which the brake fluid in the wheel cylinder flows by a pressure reduction operation of the anti-lock brake control means.

10. The brake control apparatus as claimed in claim 1, wherein
the volume chamber and the electromagnetic valve are integrally provided with the master cylinder,
the hydraulic pressure control unit has a pressure increase valve provided on an inlet side of the wheel cylinder, a pressure reduction valve provided on an outlet side of the wheel cylinder, a gate-out valve provided between a discharge side of the pump and the master cylinder, and a suction control means provided between a suction side of the pump and the master cylinder, together with the pump, and
the hydraulic pressure control unit is connected to the master cylinder side through a brake pipe.

11. A brake control apparatus comprising:
a stroke simulator into which a brake fluid that flows out of a master cylinder by driver's braking operation is able to flow;
a first oil passage which connects the stroke simulator and the master cylinder;
an electromagnetic valve which is set on the first oil passage and opens/closes the first oil passage;
a pump which can increase a pressure of a wheel cylinder that is provided for each wheel;
a second oil passage which connects the stroke simulator and an inlet section of the pump;
a third oil passage which connects an outlet section of the pump and the wheel cylinder;
a fourth oil passage which branches off from a middle point between the electromagnetic valve on the first oil passage and the master cylinder and connects with the third oil passage;
a hydraulic brake control unit which controls at least the electromagnetic valve and the pump;

a regenerative brake unit which produces a regenerative braking force for the wheel separately from the hydraulic brake control unit; and when the regenerative brake unit is operating by the driver's braking operation, the hydraulic brake control unit being configured to perform a valve open control of the electromagnetic valve and allow the brake fluid in the master cylinder to flow into the stroke simulator, and when the operation of the regenerative brake unit and an operation of the hydraulic brake control unit are switched, the hydraulic brake control unit being configured to pump up the brake fluid flowing into the stroke simulator into the wheel cylinder by the pump;

wherein the stroke simulator and a suction side of the pump are connected through a low pressure reservoir.

12. The brake control apparatus as claimed in claim 11, further comprising:

a pressure increase valve which is set on the fourth oil passage and opens/closes the fourth oil passage, and wherein the hydraulic brake control unit performs a valve close control of the pressure increase valve of the wheel when the regenerative brake unit is operating, and performs a valve open control of the pressure increase valve when the operation is switched.

13. The brake control apparatus as claimed in claim 12, wherein when the regenerative brake unit is operating, at least the electromagnetic valve is controlled by a proportional control.

14. The brake control apparatus as claimed in claim 12, wherein upon the switch of the operation, the braking force of the hydraulic brake control unit is increased in accordance with the decrease in the braking force of the regenerative brake unit.

15. The brake control apparatus as claimed in claim 11, wherein when the brake fluid in the stroke simulator becomes empty during the hydraulic brake control unit operation, the pump is stopped and a current to the electromagnetic valve is stopped, then a master cylinder pressure acts on the wheel cylinder through the fourth oil passage.

16. The brake control apparatus as claimed in claim 11, wherein the hydraulic brake control unit has an anti-lock brake control means, and a volume chamber is a reservoir into which the brake fluid in the wheel cylinder flows by a pressure reduction operation of the anti-lock brake control means.

17. A method for controlling brake of a brake apparatus, the brake apparatus having:

a stroke simulator that is a volume chamber into which a brake fluid that flows out of a master cylinder by driver's braking operation is able to flow;

a first oil passage which connects the volume chamber and the master cylinder;

an electromagnetic valve which is set on the first oil passage and opens/closes the first oil passage;

a pump which pumps up the brake fluid flowing into the volume chamber from the master cylinder and can increase a pressure of a wheel cylinder that is provided for each wheel;

a hydraulic pressure control unit having a pump which pumps up a brake fluid in the stroke simulator into which the brake fluid flowing out of a master cylinder by driver's braking operation is able to flow and can increase a pressure of a wheel cylinder provided for each wheel; and a regenerative brake unit which is provided separately from the hydraulic pressure control unit and produces a regenerative braking force for the wheel, wherein the stroke simulator and a suction side of the pump are connected through a low pressure reservoir the method comprising:

switching the braking to the braking by the hydraulic pressure control unit after the braking by the regenerative brake unit.

18. A brake control apparatus comprising:

a volume chamber into which a brake fluid that flows out of a master cylinder by driver's braking operation is able to flow;

a first oil passage which connects the volume chamber and the master cylinder;

an electromagnetic valve which is set on the first oil passage and opens/closes the first oil passage;

a pump which pumps up the brake fluid flowing into the volume chamber from the master cylinder and can increase a pressure of a wheel cylinder that is provided for each wheel;

a hydraulic pressure control unit which increases the wheel cylinder pressure by the brake fluid flowing into the volume chamber and pumped up by the pump, together with at least the electromagnetic valve, the hydraulic pressure control unit including an anti-lock brake control means; and a regenerative brake unit which is provided separately from the hydraulic pressure control unit and produces a regenerative braking force for the wheel, wherein the volume chamber functions as a reservoir and as a stroke simulator, into which the brake fluid in the wheel cylinder flows by a pressure reduction operation of the anti-lock brake control means.

* * * * *